United States Patent [19]  [11]  4,183,548
Schneckloth  [45]  Jan. 15, 1980

[54] TRAILER HITCH WITH AN INTERCHANGEABLE ROTATIVE PORTION

[76] Inventor: Raymond C. Schneckloth, Rte. 2, Clinton, Iowa 52732

[21] Appl. No.: 944,358

[22] Filed: Sep. 21, 1978

[51] Int. Cl.² .............................................. B62D 53/08
[52] U.S. Cl. ................................ 280/433; 280/415 B; 280/423 R; 280/477
[58] Field of Search ........... 280/415 R, 415 A, 423 R, 280/423 B, 438 R, 477, 504, 433

[56]  References Cited
U.S. PATENT DOCUMENTS

| | | | |
|---|---|---|---|
| 1,084,820 | 1/1914 | Pescatore | 280/438 R |
| 1,316,735 | 9/1919 | Olds | 280/438 R |
| 3,837,675 | 9/1974 | Barnes | 280/423 R |
| 3,899,194 | 8/1975 | Breford | 280/423 R |

Primary Examiner—Joseph F. Peters, Jr.
Assistant Examiner—Randall A. Schrecengost
Attorney, Agent, or Firm—Glenn H. Antrim

[57]  ABSTRACT

A portion of a hitch secured to the bed of a truck is flat so that when the hitch is not being used the hitch will not interfere with usual loading. A base is secured to the bed of a truck, and lateral spacing bars rigidly support a hold-down plate a short distance above the base. A removable, interchangeable portion connected to a goose-neck arm has a disk to be contained for rotation while the hitch is coupled, laterally between the spacing bars and vertically between the hold-down plate and the base. The peripheral edge of the disk guides it between the spacing bars to center the portions being coupled. The interchangeable portion adapts different types of couplings of connecting arms to the portion attached to the truck. Preferably, a disk or a plate is connected to the lower disk and spaced over the upper surface of the hold-down plate.

4 Claims, 6 Drawing Figures

TRAILER HITCH WITH AN INTERCHANGEABLE ROTATIVE PORTION

BACKGROUND OF THE INVENTION

This invention pertains to hitches of the type suitable for connecting goose-neck arms to the beds of pickup trucks and particularly to hitches that have means for guiding the connectors of the hitches together and that have rotary portions functioning as fifth wheels.

By using goose-neck arms on trailers and hitches mounted to the beds of pickup trucks, the trucks can readily pull maximum loads. Preferably, when the trucks are not being used to tow vehicles, portions that are attached to the beds of the trucks need be quite flat so as not to interfere with normal loading. The portions of hitches remaining on the trucks while the hitches are not being used ought to be covered or be easily cleaned to facilitate use later. Preferably, any portions of hitches permanently attached to trucks ought to be adaptable to tow different trailing vehicles having different types of hitches. Guiding means is desirable to align and guide portions of the hitches together after the portions have been brought fairly close together by positioning the towing vehicles.

A hitch having part of these desirable features is shown in U.S. Pat. No. 3,837,675 issued to Barnes et al. on Sept. 24, 1974. According to this patent, the forward end of a goose-neck arm has attached to it a polygonal-shaped plate that is to rest on a flat mounting plate attached to the bed of a pickup truck and be retained by bars attached to the mounting plate. The polygonal-shaped plate has lateral sides at an angle to converge in a forward direction so that after the forward, small end of the plate is rotated to a forward position and is positioned between the rear ends of the converging bars, the bars function as a guide for centering the plate between the more narrow forward ends of the bars. After a towing vehicle is backed to engage the parts, a locking bar is positioned back of the polygonal plate attached to the goose-neck hitch between the converging bars on the mounting plate.

SUMMARY OF THE INVENTION

A hitch according to the present invention uses a disk as a lower member on a goose-neck arm to guide itself to a position beneath a hold-down plate. The hold-down plate is preferably mounted over two parallel spacing bars that are spaced apart a distance slightly greater than the diameter of the disk. A slot centered in the hold-down plate receives an upright shaft to which the forward end of a goose-neck arm is attached. Since the coupling member is a disk, it never needs to be rotated to a particular position before portions of the hitch come together.

The mounting portion of the hitch is attached to the bed of a truck, and it is cleaned automatically during each coupling operation by the disk forcing any dirt accumulated underneath the hold-down plate forward between the spacing bars as the hold-down plate is moved rearwardly with respect to the disk. After the portions of the hitch are brought together, a retaining bar is positioned back of the shaft of the hitch and secured to the hold-down plate.

By having different coupling devices on different disks, different types of couplers on different vehicles to be towed can be readily attached to the mounting-plate assemblies connected to the beds of trucks. Preferred coupling devices that have disks that connect between the couplers on the arms and the mounting plates on the trucks are herein called fifth-wheel assemblies because the assemblies are free to be rotated as usual fifth wheels on the mounting-plate assemblies.

A typical fifth-wheel assembly of the present hitch has spaced above and parallel to the lower disk, another disk or plate to bear on the upper surface of a hold-down plate. For example, a lower disk, that is to be positioned between the hold-down plate and a mounting plate, and an upper disk, that is to be positioned above the hold-down plate, may be welded to a central shaft. The upper end of the shaft may terminate in a ball for the usual ball-and-socket type hitch, or the shaft may terminate in a king pin for accommodating a usual fifth wheel to rest on the fifth-wheel assembly of the present hitch. When the usual king pin is used, a rectangular supporting plate may be substituted for the upper disk, and a pin may be inserted between the supporting plate and the hold-down plate to prevent rotation at a lower level such that the regular fifth wheel of the towed vehicle rotates as usual on the upper surface of the supporting plate. In still another embodiment of the fifth-wheel assembly to be used with the mounting-plate assembly, a pair of spaced lugs extend upward from a plate that is positioned on the upper surface of the hold-down plate. In this manner a hitch that has a pair of ends like a clevis can be connected to the lugs such that the rotation of a towed vehicle about its longitudinal axis is stabilized by the towing vehicle. The upper member of the fifth-wheel assembly for this purpose is preferably rectangular and large enough to substantially cover the hold-down plate.

Even though the two portions of the present hitch are not very closely aligned before the towing vehicle is finally backed to engage the hitch, the lower disk will engage the spacing bars beneath the lateral edges of the hold-down plate and be aligned automatically. Preferably, diverging guiding bars extend from respective rear ends of the spacing bars rearwardly toward the respective rear corners of a mounting plate such that the lower disk may first contact an inner edge of one of the guiding bars and then be guided to the respective spacing bar.

Briefly, one of the desirable features of the present hitch is that the portion attached permanently to the bed of a truck does not interfere much with the usual loading of the truck. The procedure of coupling the hitch cleans the hitch sufficiently for it to remain operative. By using different fifth-wheel assemblies, a towing vehicle can readily be connected to different vehicles that have different types of hitches. Freedom of movement of rotation may be in another coupling that is above the fifth-wheel assembly of the present hitch, or the supporting plate and the hold-down plate of the present hitch may be lubricated to provide freedom of rotation within the present hitch. The use of a rotary lower disk to align the portions of the coupling while a towing vehicle is backed makes coupling easier and quicker. Alignment is even less critical because diverging guiding bars are used.

DESCRIPTION OF THE PREFERRED EMBODIMENTS

Figure 1:
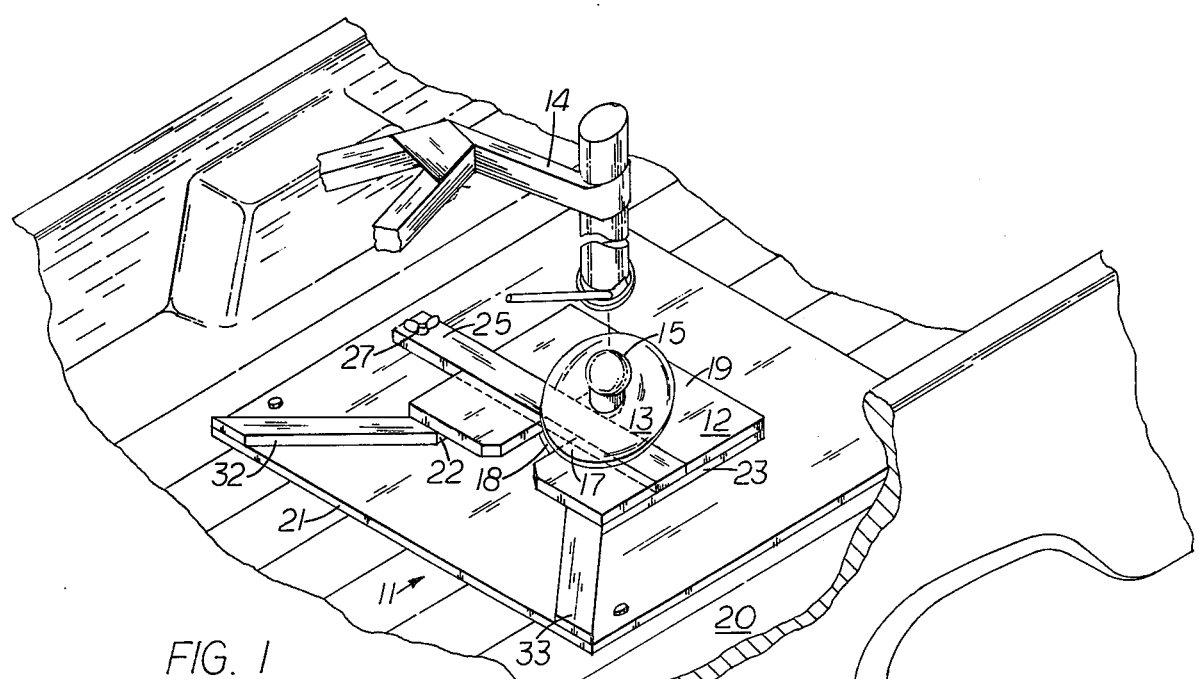
FIG. 1 is a perspective view of a coupled hitch of this invention.
Figure 3:
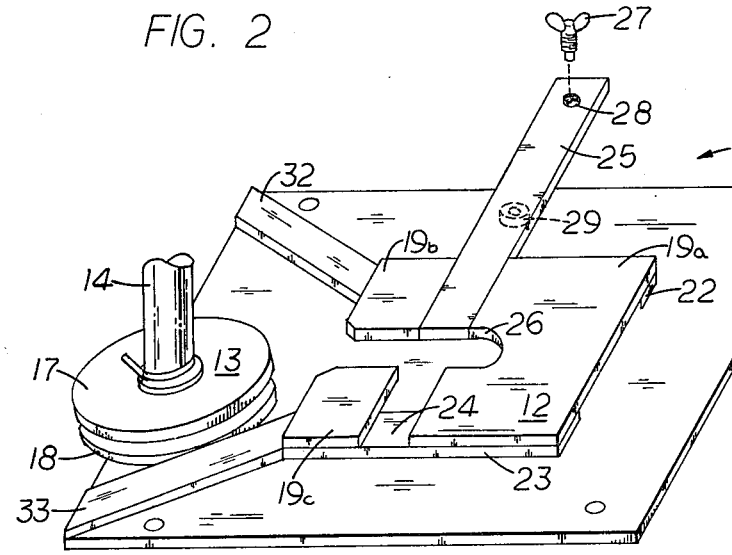
FIG. 3 is a perspective view of the hitch as it is first positioned to be coupled.

With reference to FIG. 1, a preferred trailer hitch assembly 11 for towing a vehicle, such as a recreational vehicle or a semitrailer having a goose-neck arm, comprises a mounting-plate assembly 12 and a fifth-wheel assembly 13. In FIG. 1, a goose-neck arm assembly 14 is shown disconnected from the fifth-wheel assembly 13, but generally, unless the towed vehicle is to be drawn by a different vehicle with a different hitch, the goose-neck arm assembly 14 after being attached to a ball 15 of the fifth-wheel assembly of FIG. 1, remains attached as shown in FIG. 3. The mounting-plate assembly 12 is preferably connected by conventional means to the central portion of the bed of a pickup or truck such that the hitch is located over the rear axle of the truck.

Figure 2:
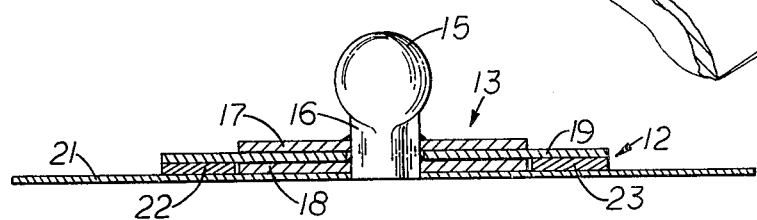
FIG. 2 is a cross-sectional view of the coupling of FIG. 1.

The term fifth-wheel assembly is used to designate the portion 13 of the hitch because like a usual fifth wheel, the assembly is free to turn on, or within, the mounting plate assembly 12. With reference to FIG. 2, the ball 15 is attached in a usual manner to a shaft 16 that is long enough to extend centrally through spaced upper disk 17 and lower disk 18. The disks 17 and 18 and the shaft 16 are welded together to provide a rigid assembly such that the disks 17 and 18 are spaced apart a distance slightly greater than the thickness of a hold-down plate 19 of the mounting plate assembly 12. The mounting plate assembly 12 comprises a base plate 21, a pair of spacing bars 22 and 23, welded to the mounting plate, and the hold-down plate 19 having its lower surface along opposite sides welded to the spacing bars. The base plate 21 is usually rectangular, and the spacing bars 22 and 23 are positioned to be in the longitudinal direction of a towing vehicle. The distance between the spacing bars 22 and 23 is slightly greater than the diameter of the lower disk 18 such that the spacing bars 22 and 23 function as guides for the lower disk 18 as well as spacers to space the hold-down plate 19 from the base 21, and the thickness of the bars 22 and 23 is slightly greater than the thickness of the lower disk 18 of the fifth-wheel assembly 13 such that the disk 18 will slide and rotate freely within the space between the hold-down plate 19 and the base 21.

Figure 6:
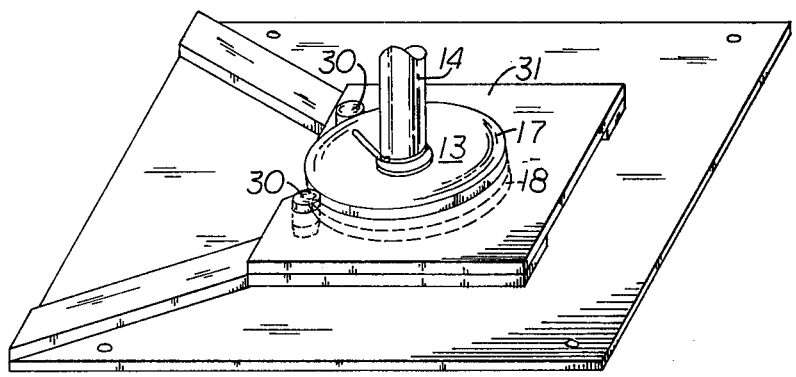
FIG. 6 is a perspective view of another embodiment of a hitch having different retaining means to maintain the hitch coupled.

The hold-down plate 19 may be a single piece as shown in FIG. 6, but in the embodiment as shown in FIGS. 1-3, the term hold-down plate includes three sections that are designated 19a, 19b, and 19c in FIG. 3. All the sections are welded to the spacing bars 22 and 23, and are separated to provide a groove 24 for receiving a transverse retaining bar 25. The sections 19b and 19c are over those ends of the respective spacing bars 22 and 23 that are toward the rear of the towing vehicle and are positioned apart sufficiently to provide a passageway therebetween for the shaft 16 of the fifth-wheel assembly 13. The rear end of the section 19a has in its rear edge a central notch 26 aligned with the passageway between the two rear sections 19b and 19c for receiving the shaft 16 when the trailer hitch assembly is coupled.

In FIG. 1, the fifth-wheel assembly 13 is shown coupled to the mounting-plate assembly 12, the shaft 16 that is attached to the ball 15 being within the notch 26 that is shown most clearly in FIG. 3. The lower disk 18 as shown most clearly in FIG. 2 is positioned between the base 21 and the hold-down plate 19, and the upper disk 17 rests on the upper surface of the hold-down plate 19. When the trailer hitch 11 is in position for towing, the retaining bar 25 extends across the spacing bars 22 and 23 within the groove 24 of FIG. 3 between the different sections of the hold-down plate 19. The bar is therefore retained vertically by the disks 17 and 18 of the fifth-wheel assembly 13, and it is retained lengthwise by a screw 27 that has a winged head. One end of the retaining bar 25 extends beyond one of the spacing bars, for example spacing bar 22, and has a threaded hole 28 for receiving the screw 27. When the retaining bar 25 is in its retaining position shown in FIG. 1, the threaded hole 28 is over a retaining collar 29 that is welded to the base 21 and that has a central hole for receiving the lower end of the screw 27. The lower end of the screw 27 need not be threaded and may be reduced slightly in diameter to be an easy fit in the hole of the retaining collar 29. Preferably, the edge about the hole of the retaining collar 29 is tapered to facilitate the entrance of the lower end of the screw 27.

According to FIG. 6, the retaining bar 25 is not used, but a pair of retaining pins 30 extend down through a one-piece hold-down plate 31 that has been substituted for the hold-down plate 19 of FIGS. 1-3, and into the base. The pins 30 are along the rear edge of the hold-down plate 31 on the opposite sides of a notch that is the passageway for the central shaft of the fifth-wheel assembly 13.

With reference to FIG. 1, as a vehicle is being towed, the shaft 16 as shown in FIG. 2 bears against the forward edge of the retaining bar 25. When the hitch is to be uncoupled, the screw 27 is turned outwardly sufficient to raise this lower end above the retaining collar 29, and the retaining bar 25 is slid outwardly to the position shown in FIG. 3. To couple the hitch, the towing vehicle is maneuvered such that the fifth-wheel assembly 13 at the end of the arm of the vehicle that is to be towed is over the central rear portion of the base 21. The front end of the vehicle to be towed is then lowered so that the lower surface of the lower disk 18 of the fifth-wheel assembly 13 rests on the base 21. As the towing vehicle is backed, the curved, peripheral edge of the disk 18 engages the front, inner edge of one of the spacers 22 and 23. As the towing vehicle continues to move backward a short distance, the contacted spacing bar 22 or 23 guides the fifth-wheel assembly 13 until the shaft 16 (FIG. 2) is positioned within the notch 26 (FIG. 3) of the hold-down plate 19. The retaining bar 25 can then be readily slid in place across the spacing bar 23 and the retaining screw 27 turn to engage the spacer 29.

Most of the area over the rear portion of the base 21 may be used as a first resting place for the fifth-wheel assembly 13 because guiding bars 32 and 33 as shown in FIGS. 1 and 3 are used. The guiding bar 32 extends from the rear end of the spacing bar 22 outwardly to a corner of the base 21, and the guiding bar 33 extends from the corresponding end of the other spacing bar 23 to the opposite rear corner of the base 21. As shown in FIG. 3, when the fifth-wheel assembly 13 is positioned such that the peripheral edge of the lower disk 18 is in contact with the inner edge of the guiding bar 33, the guiding bar 33 will be effective to center the fifth-wheel assembly 13 within the mounting-plate assembly 12 as the towing vehicle is backed.

Figure 4:
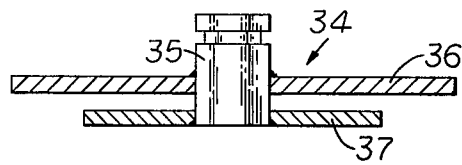
FIG. 4 is a cross-sectional view of a different embodiment of a fifth-wheel assembly using a standard king pin to which a towed vehicle is to be coupled.

For different vehicles having different hitches, different assemblies corresponding to the fifth-wheel assembly 13 are used with the mounting-plate assembly 12. For example, a fifth-wheel assembly 34 of FIG. 4 having a usual king-pin connector 35 may be used with the type of hitch commonly used in the trucking industry. The supporting plate 36 that corresponds to the upper disk 17 may be either round as shown in FIGS. 1-2 or, preferably for the usual hitch having a king pin, be rectangular. Also, the supporting plate 36 will usually have a larger surface area. Either the fifth-wheel assembly 34 or the usual fifth wheel will rotate, but if desired, pins may be used through or at the edge of the supporting plate 36 and through the hold-down plate 19 to prevent rotation of the assembly 34 such that the fifth wheel of the towed vehicle will rotate about the king pin 35 in a usual manner. When the supporting plate 36 is larger than the upper disk 17 of FIG. 1 and is square, the outer edges will be supported over the spacing bars 22 and 23 and the required surface will be provided for the fifth wheel of the vehicle being towed.

Figure 5:
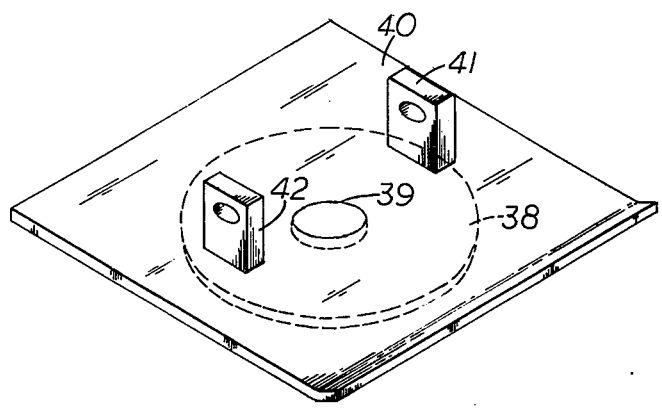
FIG. 5 is a perspective view of another embodiment of a fifth-wheel assembly.

Another embodiment to take place of the fifth-wheel assembly 13 of FIGS. 1-3 is shown in FIG. 5. This type is useful where a bifurcated coupling is used so that the towing vehicle stablizes the towed vehicle about a longitudinal axis. A lower disk 38 and a short shaft 39 correspond to the lower disk 18 and the shaft 16 respectively of FIGS. 1-3, and a larger rectangular supporting plate 40 has been substituted for the upper disk 17. Upright lugs 41 and 42 having lateral holes therethrough are connected to the supporting plate 40 for supporting the rear end of a bifurcated arm.

I claim:
1. A trailer hitch comprising:
   a base plate,
   a pair of spacing bars having lower sides secured to said base plate and being spaced apart to have opposite inner edges separated a predetermined distance,
   a hold-down member, at least one of said spacing bars having an upper side to which said hold-down member is rigidly secured, said hold-down member extending parallel to said base plate toward the opposite one of said spacing bars to provide a predetermined spacing between said hold-down member and said base plate, said base plate having an extending portion extending in the longitudinal direction of said spacing bars a substantial distance beyond said spacing bars and said hold-down member,
   a fifth-wheel coupler having a disk and a connecting shaft, the disk having a diameter slightly less than said predetermined distance between said spacing bars and a thickness slightly less than said predetermined spacing, said disk being connected perpendicularly to a lower end of said connecting shaft such that said disk can be positioned flatly on said base plate, said disk being a sliding fit between said hold-down member and said base plate to facilitate sliding said disk from a position on said extending portion to a coupled position where said disk rests on said base plate between said spacing bars and is contained closely by said hold-down plate, said disk in said coupled position being retained laterally by said spacing bars but being easily rotatable therebetween,
   said connecting shaft extending upwardly from the center of said disk, said hold-down member being shaped to provide midway between said spacing bars a passageway through which said shaft can pass from a position over said extending portion of said base plate to a position where said disk is in said coupled position,
   retaining means fastened to said base plate against which said fifth-wheel coupler bears to retain it longitudinally between said retaining bars in said coupled position, and
   means connected to said shaft for coupling to an arm of a trailer hitch.
2. A trailer hitch as claimed in claim 1 having a supporting plate connected to said connecting shaft above said disk of said fifth-wheel assembly to be positioned closely over said hold-down member.
3. A trailer hitch as claimed in claim 2 wherein said hold-down member is a plate secured to said upper side of said one spacing bar and secured to said opposite one of said spacing bars, and said passageway being a notch in said hold-down member with an opening facing said extending portion of said base plate.
4. A trailer hitch according to claim 1 having a pair of diverging guiding bars extending from respective ends of different ones of said spacing bars slantingly outwardly over said extending portion of said base plate.

* * * * *